(12) United States Patent
Calhoon et al.

(10) Patent No.: US 7,375,493 B2
(45) Date of Patent: *May 20, 2008

(54) INDUCTIVE BATTERY CHARGER

(75) Inventors: John Charles Calhoon, Woodinville, WA (US); Leroy B. Keely, Portola Valley, CA (US); William Mitchell, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/733,820

(22) Filed: Dec. 12, 2003

(65) Prior Publication Data

US 2005/0127868 A1 Jun. 16, 2005

(51) Int. Cl.
*H02J 7/00* (2006.01)
(52) U.S. Cl. ..................... 320/108; 320/106
(58) Field of Classification Search ............ 320/106, 320/108, 132, DIG. 21, 136
See application file for complete search history.

(56) References Cited

U.S. PATENT DOCUMENTS

| | | | | |
|---|---|---|---|---|
| 5,371,453 A | * | 12/1994 | Fernandez | 320/136 |
| 5,455,466 A | * | 10/1995 | Parks et al. | 307/104 |
| 5,734,254 A | * | 3/1998 | Stephens | 320/106 |
| 5,959,433 A | | 9/1999 | Rohde | 320/104 |
| 5,963,012 A | * | 10/1999 | Garcia et al. | 320/106 |
| 6,275,143 B1 | * | 8/2001 | Stobbe | 340/10.34 |
| 6,278,210 B1 | | 8/2001 | Fatula, Jr. et al. | 320/112 |
| 6,291,966 B1 | * | 9/2001 | Wendelrup et al. | 320/106 |
| 6,331,744 B1 | | 12/2001 | Chen et al. | 310/171 |
| 2002/0159434 A1 | * | 10/2002 | Gosior et al. | 370/350 |
| 2003/0155892 A1 | * | 8/2003 | Poletti | 320/137 |
| 2004/0145342 A1 | * | 7/2004 | Lyon | 320/108 |

OTHER PUBLICATIONS

Splashpower, Product Overview, www.splashpower.com, p. 1, Dec. 12, 2003.
Smart Battery System Specifications, Smart Battery Data Specification, Revision 1.1, 54 pages, Dec. 11, 1998.
Smart Battery System Specifications, Smart Battery Charger Specification, Revision 1.1, 39 pages, Dec. 11, 1998.

\* cited by examiner

*Primary Examiner*—Adolf Berhane
*Assistant Examiner*—Samuel Berhanu
(74) *Attorney, Agent, or Firm*—Birch, Stewart, Kolasch & Birch, LLP

(57) ABSTRACT

An inductive charging system transfers energy by inductively coupling a source coil on a power source to a receiver coil for a battery charger. Source current may be received in the battery charger and converted for charging a battery pack. A wireless communication arrangement may also provide for authentication of devices that are allowed by the source to be powered or otherwise charged.

21 Claims, 9 Drawing Sheets

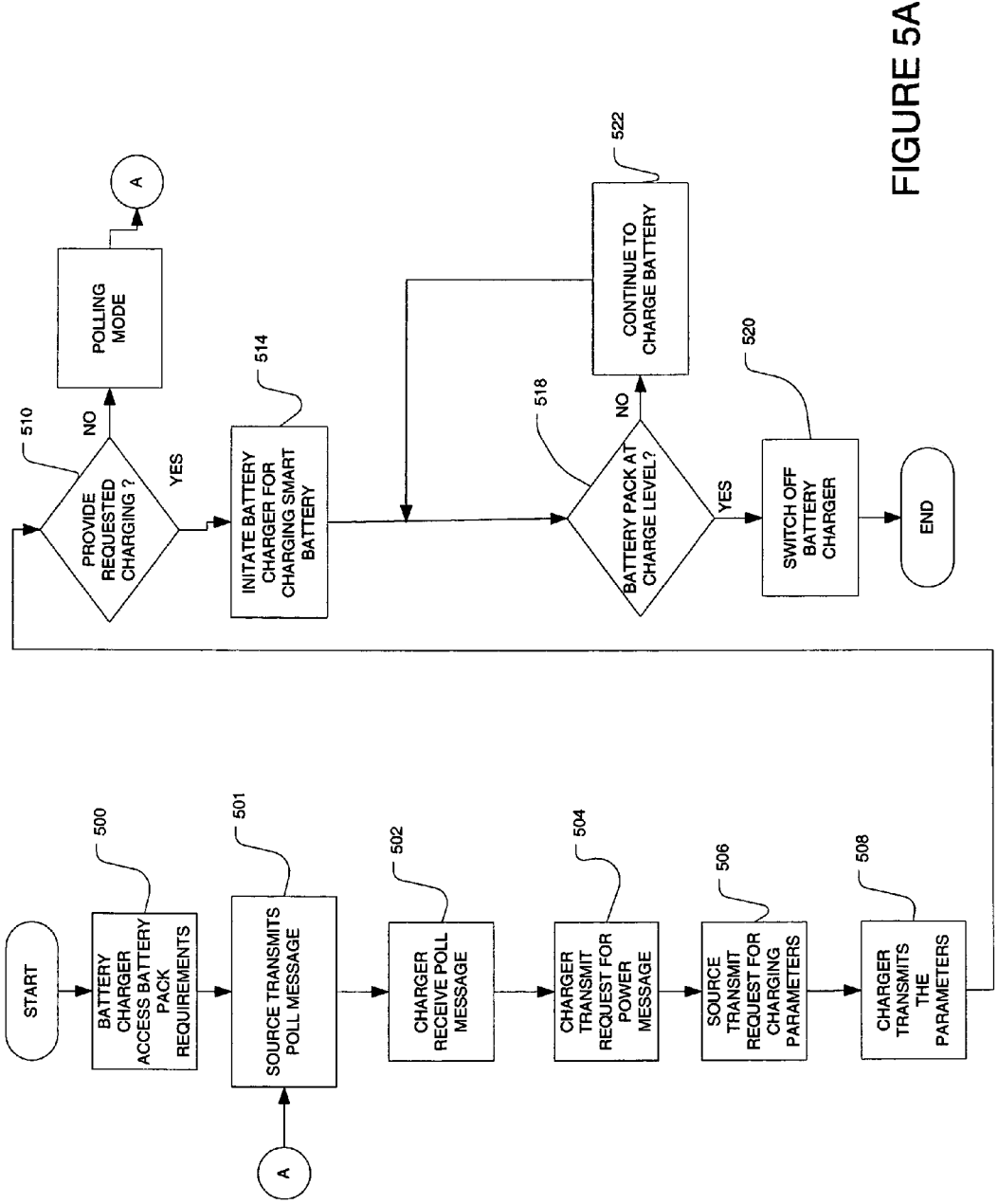

INDUCTIVE BATTERY CHARGER

CROSS REFERENCE TO RELATED APPLICATIONS

The present application is related to application Ser. No. 10/733,760, entitled "Inductively Charged Battery Pack," and filed on Dec. 12, 2003; which is related to application Ser. No. 10/733,850, entitled "Inductive Power Adapter," and filed on Dec. 12, 2003, each of which is incorporated by reference herein as to their entireties.

FIELD OF THE INVENTION

Aspects of the present invention relate to battery packs that can be coupled to electronic apparatus. More particularly, aspects of the present invention relate to an inductive battery charger for physically coupling and electrically communicating with battery packs and providing electrical energy for charging a battery pack.

BACKGROUND OF THE INVENTION

Computer systems have become increasingly popular in modern society. Conventional computer systems, especially computer systems using graphical user interface (GUI) systems, accept user input from a conventional input device, such as a keyboard for entering text, and a pointing device, such as a mouse for operating the graphical user interface. The processing capabilities of computers have increased the efficiency and productivity of workers in a wide range of professions. Marketing staff, corporate executives, professionals and others use mobile computers to easily transport their data and work with computers out of the office or on travel.

The popularity of portable electronic devices allow users to work and play free of restrictive power cords and chargers for a limited period of time. As people work outside of their traditional office, they often find themselves using their notebook computers, cellular phones, digital assistants and tablet computers. Similarly, people enjoying themselves away from the home take advantage of portable music players, digital cameras, electronic game systems and the like while on travel or doing outdoors activities.

Rechargeable batteries are used for portable electronic devices, such as portable computing systems, video cameras, and mobile phones. While users attempt to operate with the freedom of mobile computing, there are still basically tethered to the power cable. The users must think about how much power is available for mobile use. This time period is limited to the type of battery and other factors.

To replace rechargeable batteries, a contactless power supply may be used in commercial aircraft. In one example, U.S. Pat. No. 6,489,745 to Kories describes a contactless power supply for a laptop computer with a seatback tray of a commercial aircraft. This patent is incorporated by reference. The power supply of Kories has several drawbacks. There is no active communication between the power supply and the seatback. Unwanted flux could be sent to metallic objects or cause other problems. Further, the system of Kories would most likely risk damage to current mobile device designs and does not allow for device independence for powering, because the power supply part must be part of the laptop computer. Thus, the system of Kories is undesirable, and has limited use, if any, for recent battery packs designs.

To recharge batteries, U.S. Pat. No. 5,959,433 to Rohde describes a universal inductive battery charger system having a charging coil and rechargeable battery pack. The system of Rohde has several drawbacks. There is no active communication between the inductive charger and the battery pack. Unwanted flux could be sent to metallic objects or cause other problems. Thus, the system Rohde is undesirable, and limited use, if any, use for recent battery packs designs.

In view of the foregoing, what is needed is an apparatus and method to support battery packs for an untethered environment for the new media technologies and productivity activities for mobile electronic devices.

SUMMARY OF THE INVENTION

Aspects of the present invention pertain to an inductive battery charger and a method of charging a battery pack. In one aspect, the present invention relates to an inductive battery charger for physically coupling and electrically communicating with a battery pack and providing electrical energy for charging a battery pack. An aspect of the present invention pertains to an apparatus for transmitting inductive energy to a battery charger assembly. An aspect of the present invention pertains to a battery charger assembly configured for receiving inductive energy. An aspect of the present invention pertains to a computer implemented method and computer system, such as a battery charger assembly, for charging a battery pack. Aspect of the present invention pertains to a battery charger assembly that may receive electrical power through a trusted power arrangement.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

BRIEF DESCRIPTION OF THE DRAWINGS

FIG. 5A is a flow diagram of a first illustrative charging process according to one or more aspects of the present invention;

DETAILED DESCRIPTION OF THE INVENTION

Figure 1:
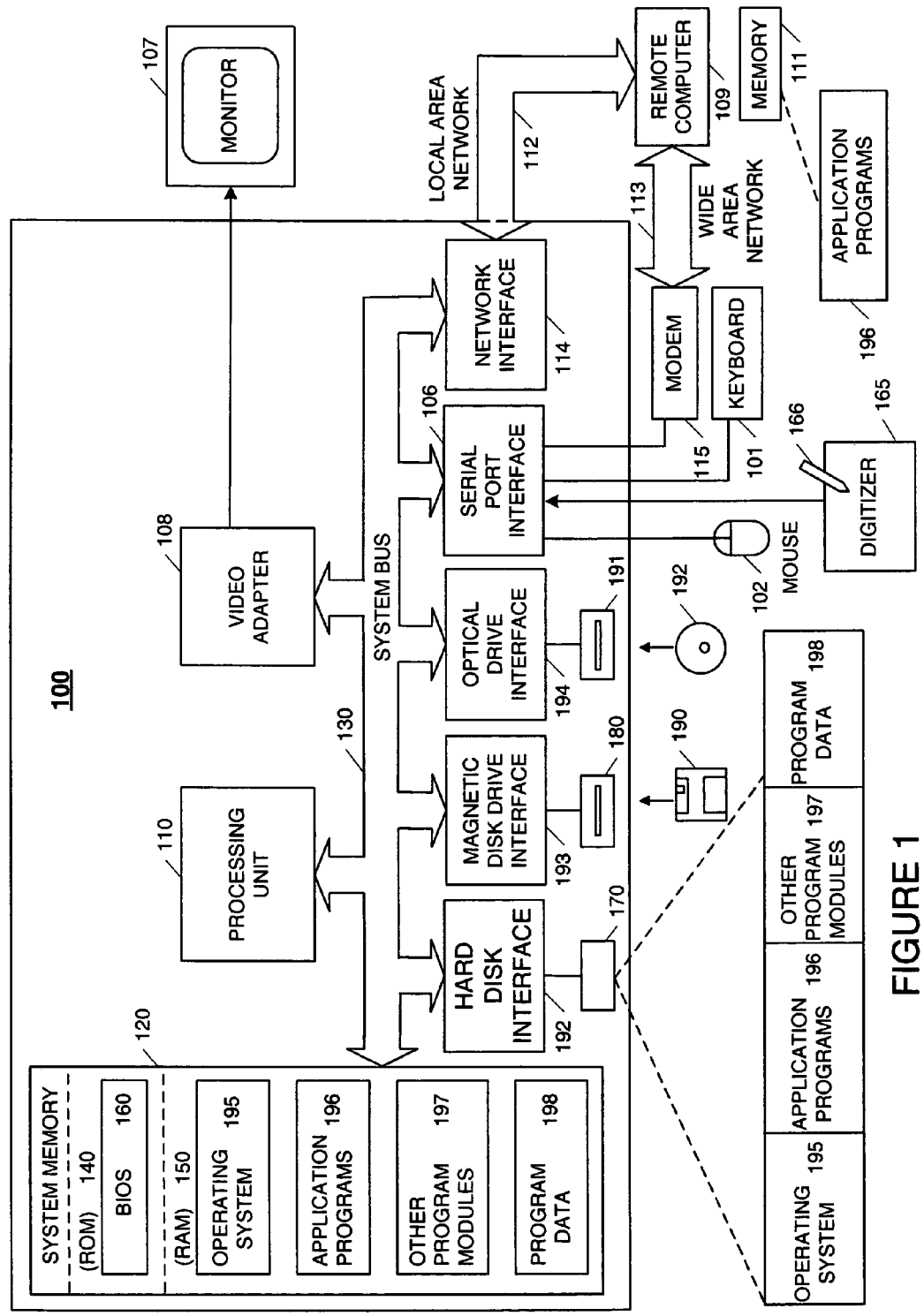
FIG. 1 is a functional block diagram of an illustrative general-purpose digital computing environment in which one or more aspects of the present invention may be implemented.

The following description is divided into sub-sections to assist the reader. The subsections include Overview; Charging System Environment; Illustrative Data Structure; Illustrative Operational Environment; and Alternative Charging Systems.

Overview

Aspects of the present invention provide inductive charging arrangements enabling user convenience in wireless power environments for mobile computing and communications devices. An inductive charging system transfers energy by inductively coupling a source coil on a power source to a receiver coil for a battery charger portion. Current flows through the source coil and the resulting magnetic flux induces an alternating current through the magnetic field and across the receiver coil, completing an energy transfer circuit. The source current may be received in the battery charger and converted for charging a battery pack. Aspects of the present invention enable communication between an inductive power source and the battery charger which maximizes the flexibility, efficiency, or safety of inductive charging solutions. Aspects of the present invention may provide for wirelessly communicating operating parameters and protocol between an inductive power source and an inductive battery charger. A wireless communication arrangement may also provide for authentication of devices that are allowed by the power source or trusted entity to be powered or otherwise charged. This prevents computerized virus infections in the battery pack that may subsequently infect a host computer connected to the battery pack and improves security functions for inductive power arrangements.

In one illustrative aspect, an inductive power source, e.g., a chargepad or battery charger, recharges legacy battery packs without the need for wall-plug powered stand alone chargers that plague the digital workplace and the home. A smart battery charger assembly inductively communicating with the inductive power source is used to couple to and deliver power as needed to the legacy batteries for recharging.

In another illustrative aspect, a battery charger assembly may include a smart controller configured to assess a legacy battery pack power requirements and wirelessly bi-directionally communicates the requirements to an inductive power source. In one illustrative aspect, an inductive source power can be in a low power mode or broadcasting mode for the bi-directional communications. The battery charger assembly may be configured to receive inductive energy transferred to it from the inductive power source. And the battery charger assembly can convert the inductive power for use with the legacy battery pack. In another aspect, a wireless communication arrangement, via an inductive communications pathway or other methods, may also provide for authentication of the battery charger that are allowed by the power source or trusted entity.

In an illustrative aspect, an apparatus is configured for transmitting inductive energy to a battery charger assembly. The battery charger assembly may include a microprocessor for processing data relevant to the inductive energy. In the apparatus, a memory may be provided for storing computer readable instructions relevant to providing energy to a battery charger assembly. A processor unit may be operatively coupled to the memory. A transmission element may be operatively coupled to the processor so as to provide the inductive energy to the battery charger assembly.

In another illustrative an aspect, a battery charger assembly may be configured for receiving inductive energy. A processor unit in the battery charger may be provided for processing computer readable data relevant to the inductive energy and for processing data communications with a computer system. The battery charger assembly may include a pick up coil configured for receiving the inductive energy. The battery charger assembly may include a charger unit may be operatively coupled to the processor unit and the pick up coil for performing charging functions. The charger may be configured to output a direct current to an energy storage unit, such as a battery pack.

In an illustrative aspect, a computer implemented method is provided for charging a battery pack with a stand-alone battery charger system. The system may include a memory for storing computer readable instructions that, when executed by a processor executes various functions. In one aspect, a polling message is received from an inductive power source. In another aspect, a request for power is transmitted to the inductive charging source. Based on the request for power, inductive power may be received from the inductive power source. In another aspect, authenticating data can be transmitted to the inductive charging source. Thus, a battery charger system can receive electrical power through a trusted power arrangement.

Charging System Environment

Figure 2:
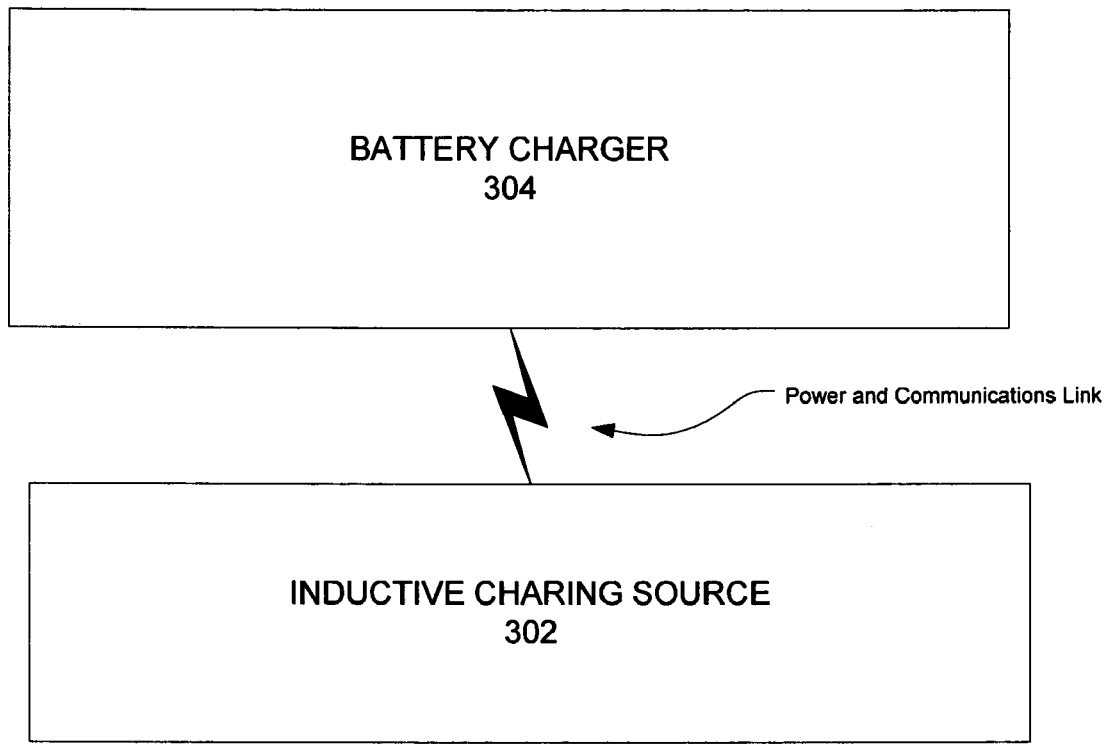
FIG. 2 is a schematic representation of a charging system according to one or more aspects of the present invention.

Various aspects of the present invention may at least be described in the general context of apparatus and computer-executable instructions, such as program modules, executed by one or more processing devices for a charging source or a battery charger assembly. Accordingly, it may be helpful to briefly discuss the components and operation of a charging system environment on which various aspects of the present invention may be implemented. Accordingly, charging system arrangements with respect to one or more aspects of the present invention are shown in FIGS. 2-8. Referring to FIG. 2, a charging system 300 may include an inductive charging source 302 that wirelessly provides electrical power and/or data communications to an inductive battery charger assembly 304. In one specific arrangement shown in FIG. 3, the battery charger assembly 304 may be physically connected to a typical legacy battery pack 350 while receiving the inductive energy from the inductive charging source 302. The battery pack 350 need not be aware of the inductive charging source. This enables the battery pack 350 to include any battery chemistry, such as NiMH (Nickel-Metal Hydride), Li+ (lithium-ion), or NiCd (nickel-cadmium) and other battery formulations. The battery charger assembly 304 may include a housing for enclosing the electrical components therein. The battery charger assembly 304 may be implemented in any appropriate shape and in a number of form factors, such as a clip-on device that mates with typically legacy battery packs, as well as any number of slots, stand or dock-type charger configurations.

Figure 3:
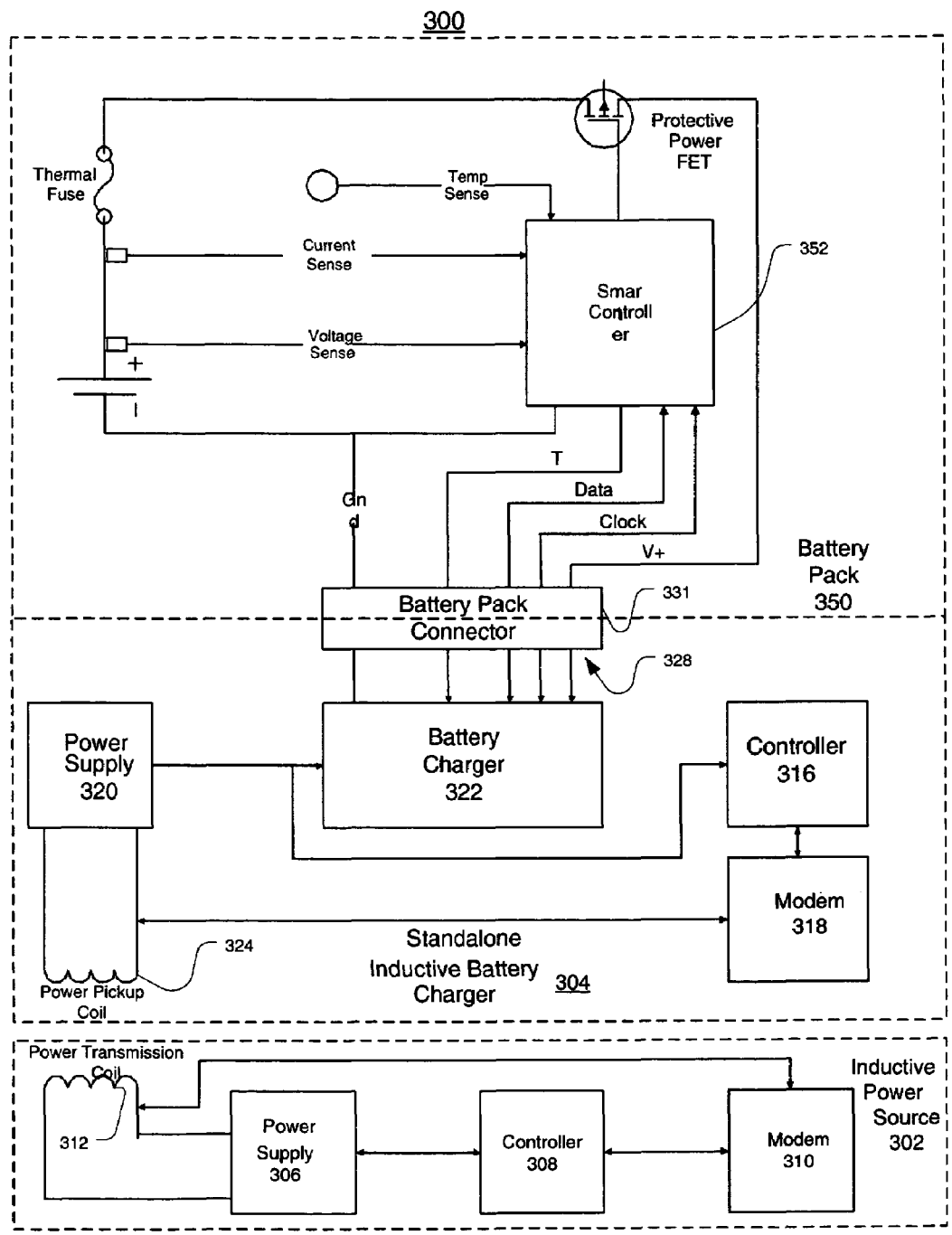
FIG. 3 is a functional block diagram of an illustrative charging system according to one or more aspects of the present invention.

Referring to FIG. 3, inductive charging source 302 may be electrically connected to an alternating current power source, such as utility electrical power and the like. In such an arrangement, inductive charging source 302 may include a power supply 306 that receives electric energy via the conventional method of a cord physically coupled to a standard wall electrical outlet (not shown) for 60 Hz, 120 volt power, or alternatively, 50 Hz at 230 volts and other frequency/voltage combinations. Nevertheless, a direct current arrangement is possible. Inductive charging source 302 includes one or more power transmission coils 312 operatively coupled to the power supply 306. The operative coupling may include any form of network connection including physical wiring and/or logical connections, and the like.

The battery charger assembly 304 may be configured to receive electrical energy from inductive power source 302. In one arrangement shown in FIG. 3, the battery charger assembly 304 includes a power pickup coil 324 that is operatively connected to a power supply 320. Power pickup coil 324 receives inductive energy from the power transmission coil 312 of inductive power source 302. In one operation, the power supply 320 of battery charger assembly 304 provides electrical energy to a battery charger 322 that supplies energy to legacy battery pack 350 through the line denoted as "V+" in FIG. 3.

In one arrangement, power supply 306 of inductive charging source 302 may be configured to convert the frequency of the alternating line current from 50/60 Hz to a higher frequency for inductively transferring energy from the power transmission coil 312 to the power pickup coil 324 of battery pack 304. The power supply 320 of battery charger assembly 304 may be configured receive the transmission frequency. The specific frequencies of transmission can be varied, i.e. for instance within the range of 500 Hz to 10 KHz. Nevertheless, other frequencies can be used.

In one operation, battery charger assembly 304 may be brought proximate or juxtaposed to the inductive charging source 302. The power transmission coil 312 of the charging source 302 and the power pickup coil 324 of the battery charger assembly 304 are then inductively coupled by a charging alternating current at any appropriate frequency to transfer the electrical power. In an arrangement of multiple battery charger assemblies, each power transmission coil 312 of power source 302 may be controlled independently of each other. This feature provides a more flexible and adaptable solution for persons or organizations with different electronic devices. The multiple battery charger assemblies may have different power requirements that can be handled by the source 302. For example, cellular phone power battery requirements are generally less than the power needs of a laptop computer battery.

Figure 5B:
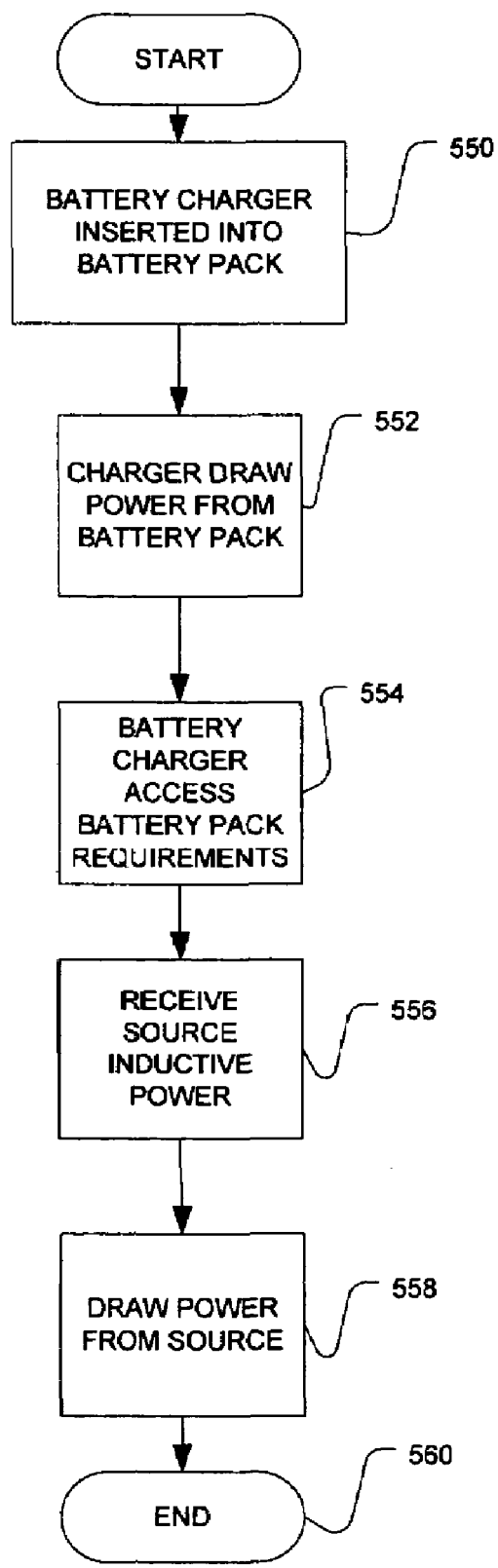
FIG. 5B is a flow diagram of an illustrative communication process according to one or more aspects of the present invention.
Figure 6:
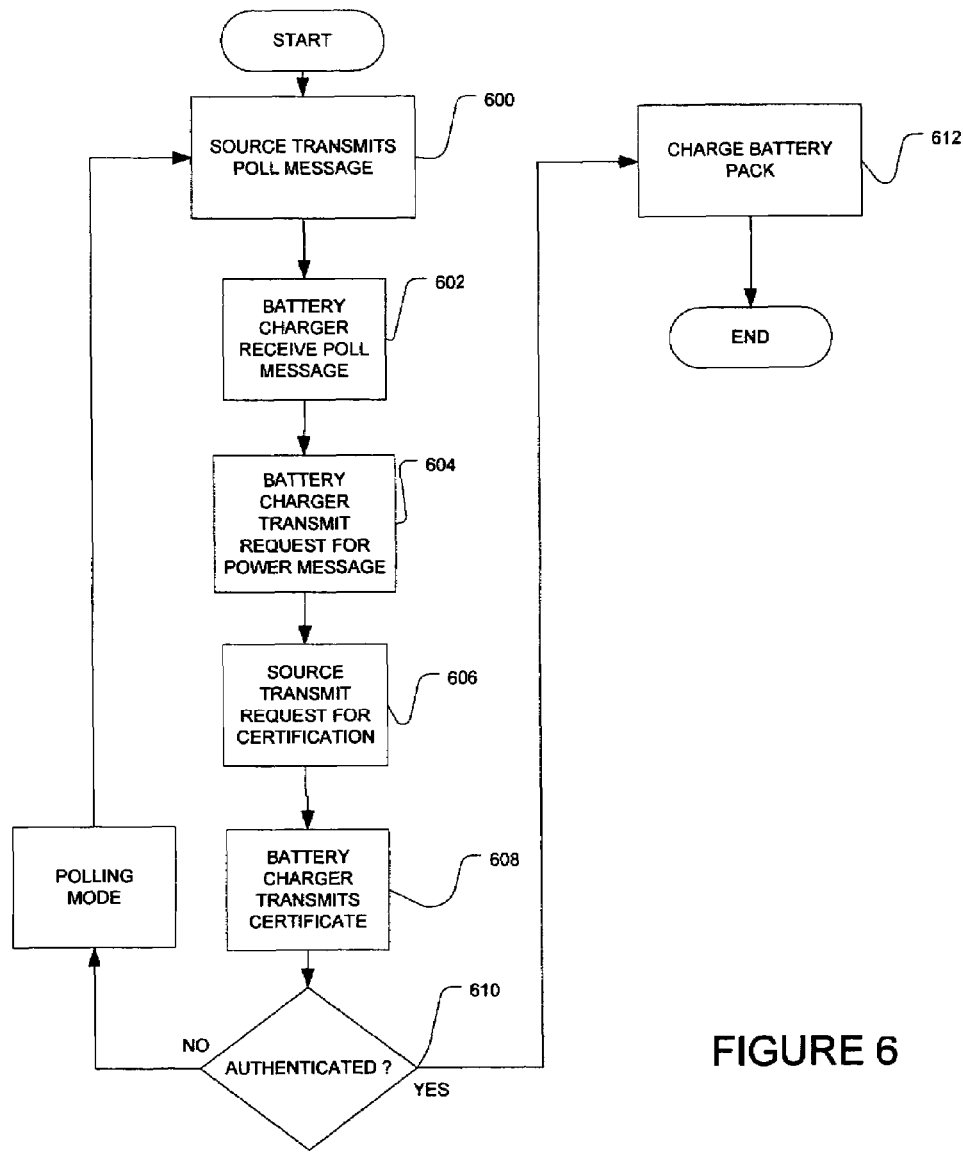
FIG. 6 is a flow diagram of a second illustrative charging process according to one or more aspects of the present invention.

In one arrangement, inductive charging source 302 and battery charger assembly 304 may be configured for wireless data communications. Example processes for implementing wireless data communications aspects are shown in FIGS. 5A, 5B and 6. Accordingly, the inductive charging source 302 may include a communication device 310, such as a modem or a network interface device. Likewise, the inductive charging module 301 of battery charger assembly 304 may also include a communications device, such as a modern 318 or a network interface device. For ease of explanation, the communication device is referred herein to as a modem. The modem 310, 318 may be configured for power line carrier communications. In such a configuration, modem 310, 318 may be operatively coupled to the respective coils 312, 324. In an arrangement, modem 310, 318 may be adapted to modulate and demodulate signals appropriate to the frequency supplied by the power supply 306, 320 to receive and transmit data. Thus, the power transmission coil 312 of the charging source 302 and the power pickup coil 324 of battery charger assembly 304 are used to provide inductive data communications over an inductive pathway.

In one arrangement, the modems 310, 318 may be implemented with power line networking technology in accordance with the HOMEPLUG 1.0 standard specification available from the Homeplug Powerline Alliance located at San Ramon, Calif., USA. For example, under a homeplug implementation, the modems would use a burst mode form of orthogonal frequency-division (OFDM) multiplexing with a forward error-correction scheme. OFDM is well known technique in industry. Rates of data transfer with homeplug can be upwards of 14 Mbps, if desired. The media access (MAC) protocol in a homeplug configuration is a based on the well-known carrier sense multiple access with collision avoidance (CSMA/CA) protocol. Rates of data transfer can be upwards of 14 Mbps, if desired. Nevertheless, a wide range of other well-known power line networking technologies could be used, such as X-10 protocol and frequency-shift keying schemes used for internetworking within homes via the power lines. Advantageously, the battery charger assembly 304 and inductive charging source 302 can be electrically coupled for wireless energy transfer functionality and data communications to wirelessly communicate operating parameters, such as charging voltage and maximum expected power consumption.

The inductive charging source 302 may include a microprocessor controller 308 that may be configured for controlling components, such as the power supply 306 or modem 310, for different modes of operation, processing and storing data. Likewise, the battery charger assembly 304 may also include a controller 316 that may be configured for receiving, transmitting and storing data and performing mathematic calculations relevant to legacy battery pack 350. Additionally, controller 308 of source 302 and controller 316 of charger 304 are enabled to have features of authentication and security. Examples of the authentication and security aspects of the present invention as shown in FIGS. 5A and 6. Controller 308 and controller 316 may have computer-readable media 415 (see FIG. 4), which provides nonvolatile storage of computer readable instructions, data structures, program modules, and other data relevant for charging operations. Other examples of computer-readable media include flash memory, random access memories (RAMs), read only memories (ROMs), and the like.

The controller 316 of battery charger assembly 304 may include a communications bus 328 with an appropriate battery connector 331 for interaction with the legacy battery pack 350. In one arrangement, controller 316 may be implemented with one or more features of a System Management Bus (SMbus). It is believed that the SMbus or features thereof have not been used before in inductive power arrangement or inductive battery chargers. Referring to FIG. 3, in one arrangement, the communication bus 328 may be configured as such a System Management Bus (SMbus). The bus 328 can be used to inform controller 316 as to a wide range of information about the legacy battery pack 350, e.g., current, voltage, power requirements, and rated capacity. The SMBus is a two-wire interface system. As shown in FIG. 3, one wire handles the data transfer; and the other wire pertains to the clock. An example of a SMbus and functions are described in the System Management Bus Specification Revision 2.0 standard available from the SBS Implementers Forum. If desired, controller 308 may be implemented with one or more features of a SMBus system as well. It is recognized that smart controller 352 of legacy battery pack 350 in FIG. 3 may with operate an SMbus via connector 331.

In an alternative arrangement shown in FIG. 3, the power supply 320 can provide current as an output to the battery charger 322, and the power supply 320 can be a SMBus device enabled to communicate on the SMbus with other devices. Likewise, battery charger 322, controller 316, or modem 318 can be SMbus devices. In this alternative arrangement, power supply 320 may be in logical communications with battery charger 322, controller 316, or modem 318. The power supply 320, battery charger 322, controller 316, or modem 318 may be configured to communicate with protocols such as shown in the noted System Management Bus Specification. Alternatively, the inductive power source 302 may include components therein configured as SMBus devices. For example, power supply 306, controller 308, or modem 310 may be SMBus operable devices. It will be appreciated that the connections shown in FIG. 3 are exemplary and other applicable techniques for establishing a communications link between the components may used. For example, in the battery charger assembly 304, the connections between the controller 316 and power supply 320; between the controller 316 and the battery charger 322; between the power supply 320 and battery pack 350; and between the power supply 320 and modem 318 are exemplary. In another alternative arrangement, a thermistor or "T" line between the charger 322 of battery charger assembly 304 and the battery pack 350 can be used as a safety control to disrupt charging in the event the battery pack 350 experiences an overcharge or over-temperature condition.

Illustrative Data Structure

Figure 4:
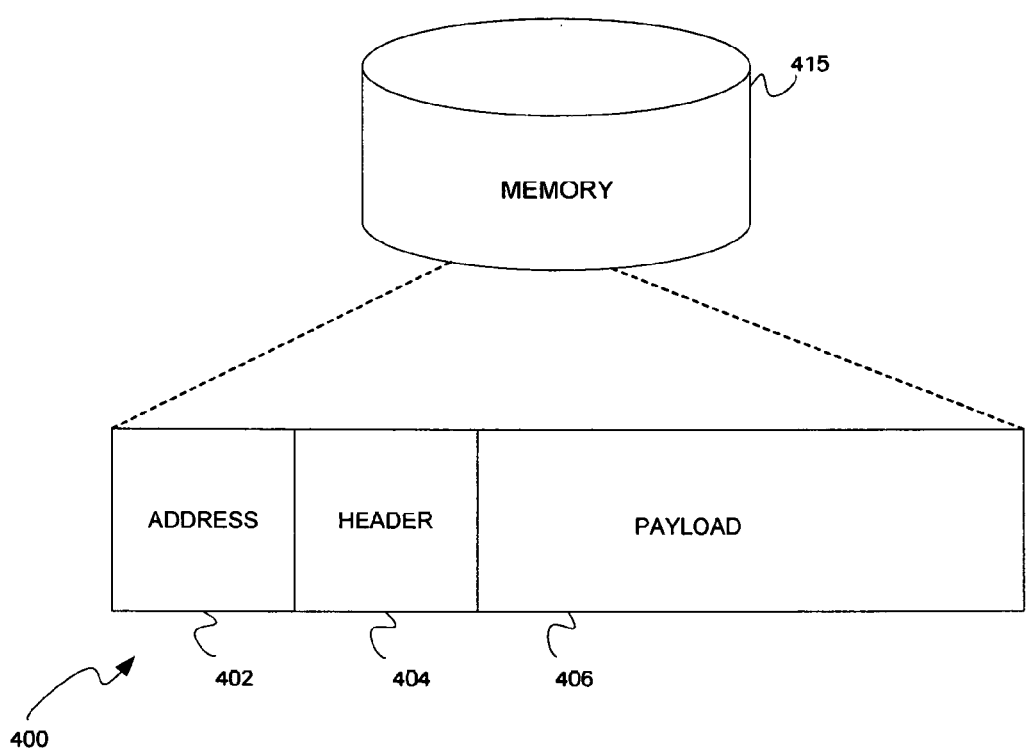
FIG. 4 is a block diagram of an illustrative data structure according to one or more aspects of the present invention.

FIG. 4 illustrates an example schematic diagram of a data structure 400 which can be transmitted between the modems 310, 318 or, alternatively, between a plurality of modems in a multiple battery charger assembly environment. Data structure 400 may include an address 402, a header 404, and a payload 406. Address 402 includes data for the specific battery pack being charged. This is useful in the multiple battery pack environment because different battery packs can have different charging requirements. The header 404 includes general data to be used by the controllers 308, controller 316, are modems 310, 318. The payload 406 contents specific data to be used by the controllers 308, 316 relevant to the charging operation. Such data would include operating parameters, such as charging voltage and maximum expected power consumption. Nevertheless, the payload 406 may include other data, such as authentication information. Data structure 400 could be implemented with well-known powerline networking technology and/or encapsulated in another structure of packets for transmission, such as Bluetooth protocol. homeplug, or X-10 protocol and the like.

Illustrative Operational Environment

In one arrangement, controller 316 may contain computer readable data programmed by the manufacturer or other entity, such as a battery charger ID number, serial number, manufacturer's name and date of manufacture. This data can be used by the inductive power source 302 for novel power operations according to aspects of the present invention, such as shown in FIGS. 5A, 5B, and 6.

Accordingly, FIG. 5A illustrates an example communication process according to one or more aspects of the present invention that enables communication between a charging source and a battery charger assembly. Various aspects of the present invention may at least be described in the general context of apparatus and computer-executable instructions, such as program modules, executed by one or more computers or other devices, such as microprocessors. For example, controller 308 and controller 316 may have computer-readable media 415, which provides nonvolatile storage of computer readable instructions, data structures, program modules, and other data relevant for charging operations. In one arrangement, inductive charging source 302 and battery charger assembly 304 may be configured for wireless data communications as well as energy transfer. Accordingly, inductive power source 302 may be configured to poll for other devices, such as the battery charger assembly 304.

In FIG. 5A, process blocks 500-510 illustrate a negotiation process in which communications and power requirements can be established between inductive charging source 302 and battery charger assembly 304. To start the process in block 500, battery charger assembly 304 is enabled to determine the power requirements or other data of a battery pack 350 when inserted into communication bus 328. Requirements data are obtained from the smart controller 352 of battery pack 350. In one implementation, the requirements data may include those as specified in the smart battery data specification revision 1.1 available from the SBS Implementer Forum. For example, values for the charging current and the charging voltage may be determined from the battery pack 350. The requirements data, once obtained from the battery pack 350, may be stored in the computer readable storage 415 of controller 316 for use during charging operations or for later transmission to the inductive power source 302. Nevertheless, the controller 316 of battery charger assembly 350 may be configured to read, via the bus 328, other functions, alarms, and signals from the battery pack 350. For example, values can be obtained from the battery pack 350 for battery pack voltage, relative state of charge, absolute state of charge, remaining capacity, full charge capacity, alarm warning, average time to full, battery chemistry.

In process block 501, the inductive charging source 302, in a low power or broadcast mode, may poll for compatible devices through one or more of the power transmission coils 312 and listens for replies from the devices, such as battery charger assembly 304. The inductive charging source 302 may perform the polling operation in a sequential fashion, making each power transmission coil an independent node in the system 300. This independent node arrangement enables multiple battery charger assemblies to communicate with and be powered by inductive charging source 302. The multiple battery packs may have different power requirements which can be handled by the source 302. For example, a cellular phone power requirement is less than that of a laptop computer. In a polling operation, power transmission coil 312 can be energized and de-energized in a regular periodic fashion. For example, the energizing and de-energizing period range between any appropriate value, such as 100-1000 msec., or 1-60 sec. Nevertheless, other time values are possible. Advantageously, this periodic arrangement can conserve energy.

In process block 502, the battery charger assembly 304 has at least a listening mode and a charging mode. In the listening mode, the battery charger assembly 304, via controller 316, is configured to listen for a charging source 302 through the power pickup coil 324. In generally, the battery charger assembly 304 may be brought within a proximate distance to the inductive charging source 302. Once the transmission coil 312 and pickup coil 324 are in close enough proximity to establish communications and inductive coupling, the communication signals received by the pickup coil 324 are de-modulated by the modem 308 and routed to the battery charger assembly 304 controller 316. Of course, the communication signals may be the type as referenced with data structure 400(See FIG. 4). It should be recognized that the controller 308 generates communication signals in the source 302 and the signals are converted for power line modulation by the modem 308. The communication signals are routed from the modem 308 to the power transmission coil 312 for transmission to a power pickup coil 324.

In process block 504, as determined by the battery charger assembly 304 obtaining an indication during the requirements data step shown in block 500, if battery pack 350 is in need for recharging, the battery charger assembly 304 may respond to the source 302 poll with a message requesting that power be supplied for charging thereof. In process block 506, upon receiving the battery charger assembly 304 request for power, the source 302 may request information or charging parameters from the battery charger assembly 304, such as the required charging voltage and maximum power requirement. Nevertheless, the inductive charging source 302 can request other information relevant to the battery charger assembly 304, such as a battery charger identification (ID) number, battery type chemistry of the battery pack, or serial number of the battery charger or the serial number of the battery pack. This information can be used for security, data integrity, or other purposes. In process block 508, the battery charger assembly 304 transmits the requested information. In process block 510, the source 302, via controller 308, determines if it can supply the requested voltage and power to battery charger assembly 304. In process block 512, if the source 302 cannot supply the requested voltage and/or power, then the source 302 can change to the polling mode. Alternatively, if the source 302 can provide the voltage and/or power, then the process flows to process block 514 for the charging mode.

After the negotiation process, in process block 514, when the battery charger assembly 304 begins to receive its requested voltage and power, the controller 316 may turn on the battery charger 322 in order to charge the battery pack 350. In process block 520, if the battery is charged to the desired level, the battery charger 322 can be switched off-line. When power from the source is lost, the battery pack returns to its listening mode. In process block 522, if the battery 314 is not at the desired level of charge, then the charging process is continued.

FIG. 5B illustrates an example communication process according to one or more aspects of the present invention that between a charging source and the battery charger assembly. In blocks 550-552, when a battery pack 350 is inserted into the battery charger assembly 304, the battery charger assembly 304 may draw power from the battery pack. In block 554, controller 316 of the battery charger assembly 304 may determine or otherwise access the battery pack 350 charging requirements and charge parameters as discussed with respect to block 500 shown in FIG. 5A. The requirements data and parameters can be stored in the non-volatile computer readable memory 415 for later use. In block 556, when the power pickup coil 324 in the battery charger assembly 304 comes into close enough proximity to the power transmission coil 312 in the source 302, the power supply 320 may be configured to generate enough current to power the controller 316. Thus, in block 558, the battery charger assembly 304 may switch from battery power to inductive power from the source 302. Nevertheless, any or all of steps shown in blocks 514-522 in FIG. 5A can be implemented in the process shown in FIG. 5A. The configuration shown in FIG. 5B is useful when the battery charger assembly 304 is reused to charge different battery packs. The charger 302 may be inserted in different battery packs to access the charging requirements of each pack. In one example, the battery pack ID of each battery pack may be stored along with the charging requirements. Battery charger assembly 304 may then have a plurality of different charging requirements stored therein. In the standalone configuration, because the requirements data may be stored for each battery pack, the battery charger assembly 304 can be battery pack independent, and can still provide the needed charging when the battery charger assembly 304 is in proximity of the inductive power source 302 for charging.

FIG. 6 illustrates an illustrative communication process according to one or more aspects of the present invention to enable communication between an inductive power source and a battery charging assembly. In one arrangement, inductive charging source 302 and battery charger assembly 304 may be configured for wireless data communications as well as energy transfer based on authentication information thereby forming a trusted energy transfer arrangement. This trusted energy transfer arrangement is useful to prevent authorized use of an inductive charging source. Also the trusted energy transfer arrangement may prevent a computer virus from infecting the controller 316 or the host device 100. Additionally, this trusted arrangement can prevent unwanted power from being transmitted to metallic objects, such as writing instruments, beverage cans and staplers, which may be placed in close proximity to a charging source.

To start the process, in process block 600, the inductive charging source 302, in a low power or broadcast mode, polls for compatible devices through one or more of the power transmission coils 312 and listens for replies from the devices, such as battery charger assembly 304. In process block 602, in the listening mode, the battery charger assembly 304, via controller 316, is configured to listen for a charging source through the power pickup coil 324. Once the transmission coil 312 and pickup coil 324 are in close enough proximity to establish communications and inductive coupling, the communication signals received by the pickup coil 324 are de-modulated by the modem 308 and routed to the battery charger assembly 304 controller 316. In process block 604, if battery cell 314 is in need for recharging, the battery charger assembly 304 may respond to the source 302 poll with a message requesting that power be supplied thereof.

In process block 606, upon receiving the battery pack's request for power, the inductive charging source 302 may request for a security certificate or digital signature from the battery charger assembly 304 to authenticate it. The security certification or digital signature may be stored in the computer readable storage of the controller 308. In process block 608, if battery charger assembly 304 has a digital certificate or digital signature stored, the battery charger assembly 304 transmits it to the source 302. In process block 610, if the battery charger assembly 304 is authenticated in view of the certification or signature, the source 302 supplies the requested voltage and power the battery charger as shown in process block 612. During the powering process, the source 302 may periodically poll the battery charger assembly 304, and if no response is received or inductive coupling is removed, the source 302 changes state from the charging mode to return to the polling mode. In process block 610, if the battery charger assembly 304 is not authenticated, or the source 302 cannot supply the requested voltage or power, the source 302 will remain in low power mode, and the source 302 will return to polling mode. Nevertheless, steps any or all of steps shown in blocks 500-522 in FIG. 5A, and steps shown in blocks 550-560 in FIG. 5B, and can be implemented in the process shown in FIG. 6.

Alternative Charging Systems

Figure 7:
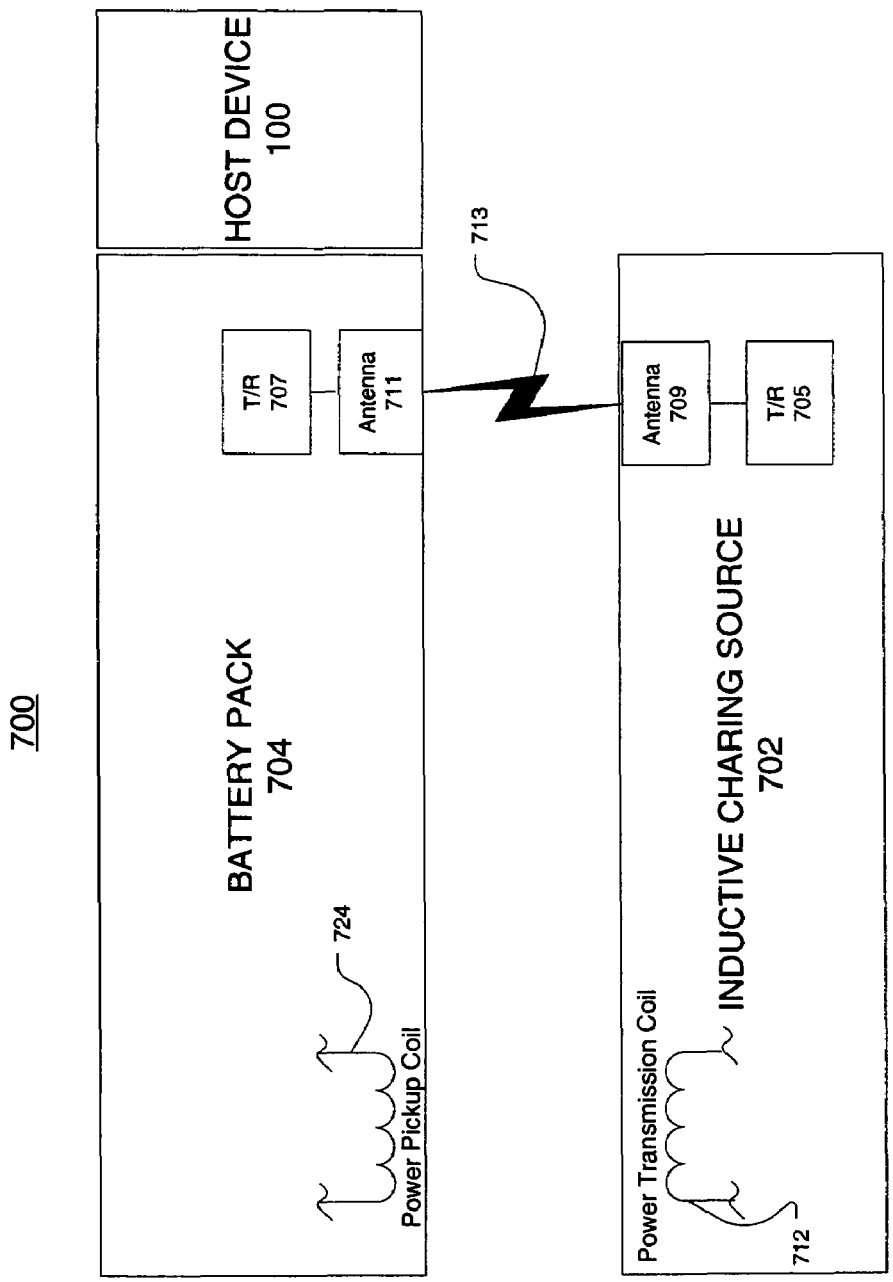
FIG. 7 is a functional block diagram of an alternative charging system according to one or more aspects of the present invention.

An alternative the charging system 700 is illustrated in FIG. 7. Charging system 700 components may include an inductive charging source 702 that wirelessly provides electrical power to a battery pack 704 configured with an inductive charging portion or module 701. In the charging system 700 communications between the inductive charging source 702 and battery pack 704 may be accomplished via an antenna and transceiver arrangement. A transceiver 705, 707 may be operatively coupled to an antenna 709, 711 for receiving and transmitting a wireless communication payload for both the inductive charging source 702 and the battery pack 704. Any or all features and functions, subsystems shown in FIG. 3 can be implemented in the charging system 700 shown in FIG. 7. For example, transceiver 705, 707 are respectively operatively coupled to a controller of inductive charging source 702, and controller of battery charger 704. Power pickup coil 724 can receive inductive energy from the power transmission coil 712 of inductive source 702.

In one arrangement, a communications link 713 in accordance with the Bluetooth™ Global Specification for wireless connectivity may be implemented to transmit battery charging information between the inductive charging source 702 and battery pack 704. It should be appreciated that conventional Bluetooth™ technology was introduced to provide connectivity between portable devices like mobile phones, laptops, personal digital assistants (PDAs), and other nomadic devices up to a range of approximately 100 meters. Bluetooth-enabled devices operate in an unlicensed Instrumentation, Scientific, Medical (ISM) band at 2.4 GHz. This system uses frequency-hopping to enable the construction of low-power, low-cost radio devices with a small footprint. The Bluetooth-enabled devices transmit and receive on 79 different hop frequencies from 2402 to 2480 MHz, switching between one hop frequency to another in a pseudo-random sequence, 1600 times a second. The gross data rate is 1 Mb/s. A time-division duplex scheme is used for full-duplex transmission. In another example, a communication link 713 may be a widely available communication standard, such as the Infrared Data Association ("IrDA") specification and protocols. This wireless communication protocol provide low-cost, short-range, cross-platform, point-to-point communications at various transfer rates for devices employing the standardized protocol. There are various suppliers of compatible hardware for transceivers and interfacing software modules to implement for the battery charger assembly 304 and inductive power source 302.

Figure 8:
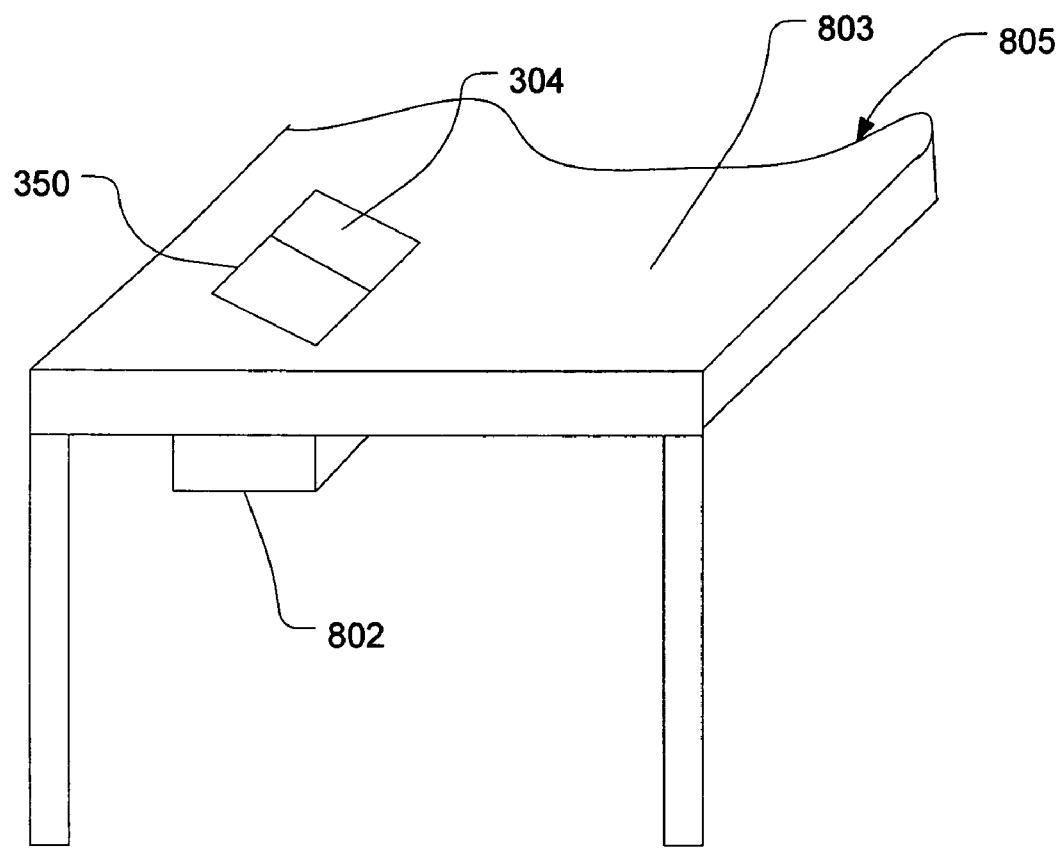
FIG. 8 is a schematic representation of a charging system according to one or more aspects of the present invention.

An example charging system 800 is illustrated in FIG. 8. Charging system 800 components may include an inductive charging source 802 that wirelessly provides electrical power to a battery charger assembly 302 attach a battery pack 305. It should be noted that any or all of the features, subsystems, and functions of inductive charging source 302 and 702 may be included in the inductive charging source 802. As shown in FIG. 8, a battery charger assembly 302 may placed on a work surface 803 of a table 805. The battery pack 350 may be physically and electrically collected to the battery charger assembly 302. The work surface may have top surface and a bottom surface. In one arrangement, the inductive charging source 302 can be physically mounted underneath the work surface 803 on the bottom surface. Alternatively, the inductive charging source 802 may be disposed inside the work surface 803 so that the source 802 is generally recessed therein, e.g., slightly underneath the top surface. This configuration allows the source 302 to be located at a short distance from the battery pack for maximum efficiency of energy transfer and inductive coupling. Nevertheless, multiple charging sources can be provided on or with the work surface. This allows for multiple mobile devices to be charged in the same location. Nonetheless, the inductive charging source 302 may be placed on the top surface instead of being embedded.

Referring to FIG. 3, in one alternative arrangement, inductive power source 302 may operate in a networked environment using logical connections to one or more computers 100 or remote computers, such as a remote computer 109 shown in FIG. 1. Various aspects of the present invention may at least be described in the general context of apparatus and computer-executable instructions, such as program modules, executed by one or more computers or other devices. Accordingly, it may be helpful to briefly discuss the components and operation of a general purpose computing environment on which various aspects of the present invention may be implemented.

Accordingly, FIG. 1 illustrates a schematic diagram of an illustrative general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, compact flash cards, smart media, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108.

In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device. It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server.

The computer 100 and remote computer 109 can be provided at a trusted entity. Thus, in a networked configuration, the inductive power source 302 is enabled to receive data associated with the battery charger assembly 304, and transmit this data for trusted energy communications. For example, the remote computer 109 may be associated with a source entity that may retain data, such as battery charger ID numbers, serial numbers, manufacturer's names and date of manufactures of various battery charger assemblies. This information can be used for data integrity and security. Further, the source entity may include digital certificate information or a digital signature and transmit those items to the inductive power source 302 as requested. This data can be used as depicted in FIG. 6 for authentication for trusted energy transfer arrangement.

Inductive charging arrangements provide user convenience by providing wireless power to mobile devices and communications devices. To maximize the flexibility, efficiency and/or safety of these inductive charging arrangements, communication between the source and the consuming device may be established to exchange various parameters and protocols. The communication may also provide for authentication of devices that are allowed by the source to be charged and devices which may be placed in close proximity to the inductive power source. This prevents virus infections and effectively closes a backdoor for computer viruses. Thus, computer users do not need to carry power cables and AC power adapters with them. There is no need to search for an electrical plug location that may be in inconvenient places. The hazards related to power cords are eliminated. Thus, the mobile computing user may receive freedom of portable computing and protection from computer viruses which may attempt to infect the battery pack or charger assembly during data transmission or energy transfer. This particularly helpful because once a legacy battery pack is re-connected to a computer, viruses are prevented from being injected by the battery pack to the computer.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the aspects may be implemented via Application Specific Integrated Circuits (ASICs). Those, however, skilled in the art will recognize that the embodiments disclosed herein, in whole or in part, can be equivalently implemented in standard Integrated Circuits, as a computer program running on a computer, as a program running on a processor, as firmware, or as virtually any combination thereof and that designing the circuitry and/or writing the code for the software or firmware would be well within the skill of one of ordinary skill in the art in light of this disclosure.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A computer implemented method of providing inductive energy to a battery charger assembly, the method comprising the steps of: at the battery charger assembly, a coil wirelessly receiving a polling message from an inductive source by listening for the source to alternate between an energized state and a de-energized state at regular intervals, the polling message being received while the battery charger assembly is in a polling listening mode;

transmitting a request for power to the source responsive to receiving the polling message;
receiving inductive power via the coil from the source responsive to the request,
displaying an object on a graphical user interface indicative of the step of receiving for indicating a type of power being received;
outputting a direct current powered by the received inductive power; and
supplying the direct current to a separate battery pack, the battery pack being detachable from the battery charger assembly.

2. The method in accordance with claim 1, in which the step of transmitting includes a step of transmitting a plurality of power parameters to the source.

3. The method in accordance with claim 1, in which the step of transmitting includes a step of transmitting authenticating data to the source.

4. The method in accordance with claim 1, further including a step of converting the inductive power to a direct current responsive to the step of receiving.

5. The method in accordance with claim 1, further including a step of receiving power parameters from a battery pack, and storing the power parameters in a computer readable memory.

6. The method in accordance with claim 5, in which the step of transmitting includes a step of transmitting the power parameters to the source.

7. An energy transfer apparatus, comprising:
a power pickup coil for receiving inductive energy from an inductive power source and for transmitting power to a power supply;
the power supply for receiving power from the power pickup coil and for transmitting power to an electrical load, and operatively connected to a processor unit;
the electrical load for receiving power from the power supply and operatively connected to the processor unit;
the processor unit for processing computer readable data, and operatively connected to the power supply, the electrical load, and a communications unit;
a memory for storing computer readable data relevant to receiving power from an inductive energy source, and operatively connected to the processor unit, and,
the communications unit operatively connected to the processor unit wherein the communications unit includes circuitry for receiving a polling message from the inductive power source, while in a polling listening mode, by listening for the inductive power source to alternate between an energized state and de-energized state at regular intervals, and transmitting a request for power message to the inductive power source.

8. The apparatus in accordance with claim 7, in which the processor unit is configured to provide authentication data for inductive energy reception.

9. The apparatus in accordance with claim 7, in which the processor unit is configured to receive a plurality of power parameters from the battery pack; store the power parameters in a memory; and transmit the power requirements to the inductive power source.

10. The apparatus in accordance with claim 8, in which the processor unit is configured to provide a digital certificate to a power source.

11. The apparatus in accordance with claim 7, in which the processor unit is configured to draw electrical power from the battery pack; and responsive to receiving an indication of inductive energy at the coil; the processor unit configured to draw electrical power via the coil.

12. The apparatus in accordance with claim 8, further comprising an antenna and a communications device configured to receive the computer readable data and configured to transmit the data to the antenna for wireless data communications to a power source.

13. The apparatus of claim 7, wherein the communication unit transmits a message including a header and a payload to the inductive power source.

14. The apparatus of claim 13 wherein the payload contains specific data relevant to power consumption.

15. The apparatus of claim 13 wherein the payload includes at least one of an operating parameter and authentication information.

16. The apparatus of claim 15 wherein the operating parameter corresponds to a charging voltage or a maximum expected power consumption.

17. The apparatus of claim 7, wherein the electrical load is a battery charger.

18. The apparatus of claim 7, wherein the power pickup coil is operatively connected to the communications unit.

19. The apparatus of claim 7, wherein the electrical load is logically connected to a separate battery pack.

20. An energy receiving apparatus, comprising:
a power pickup coil for receiving inductive energy from an inductive power source and for transmitting power to a power supply;
the power supply operatively connected to a processor unit, said power supply receiving power from the power pickup coil and transmitting power to a battery charging unit;
the battery charging unit receiving power from the power supply to charge a battery unit;
the processor unit operatively connected to the battery charging unit, the power supply, and a communications unit;
said processor unit determining battery charging parameters; and
a memory operatively connected to the processor unit for storing computer readable data including the battery charging parameters;
the communications unit operatively connected to the processor unit and the memory wherein the communications unit includes circuitry for receiving a polling message from the inductive power source, while in a polling listening mode, by listening for the inductive power source to alternate between an energized state and de-energized state at regular intervals, and in response to receiving the polling message, transmitting a request for power message and the battery charging parameters to the inductive power source.

21. The energy receiving apparatus of claim 20, wherein the battery charging parameters are transmitted in response to receiving a request from the inductive power source.

* * * * *

UNITED STATES PATENT AND TRADEMARK OFFICE
CERTIFICATE OF CORRECTION

| | | |
|---|---|---|
| PATENT NO. | : 7,375,493 B2 | Page 1 of 1 |
| APPLICATION NO. | : 10/733820 | |
| DATED | : May 20, 2008 | |
| INVENTOR(S) | : John Charles Calhoon et al. | |

It is certified that error appears in the above-identified patent and that said Letters Patent is hereby corrected as shown below:

In column 15, line 49, in Claim 7, after "state and" insert -- a --.

In column 16, line 54, in Claim 20, after "and" insert -- a --.

Signed and Sealed this
Twenty-sixth Day of April, 2011

David J. Kappos
*Director of the United States Patent and Trademark Office*